(12) United States Patent
Kino et al.

(10) Patent No.: US 7,469,922 B2
(45) Date of Patent: Dec. 30, 2008

(54) HEAD-PROTECTING AIRBAG APPARATUS

(75) Inventors: Masao Kino, Aichi-ken (JP); Naoki Hotta, Aichi-ken (JP); Yasuo Ochiai, Aichi-ken (JP); Yasushi Masuda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/485,320

(22) Filed: Jul. 13, 2006

(65) Prior Publication Data

US 2007/0013173 A1 Jan. 18, 2007

(30) Foreign Application Priority Data

Jul. 14, 2005 (JP) ............................. 2005-205879

(51) Int. Cl.
*B60R 21/16* (2006.01)
*B60R 21/213* (2006.01)
*B60R 21/233* (2006.01)

(52) U.S. Cl. .................. 280/729; 280/730.2; 280/743.1

(58) Field of Classification Search .............. 280/730.2, 280/743.1, 729; *B60R 21/213*
See application file for complete search history.

(56) References Cited

U.S. PATENT DOCUMENTS

| 6,332,628 | B1 * | 12/2001 | Tschaeschke | ............ 280/730.2 |
|---|---|---|---|---|
| 6,428,037 | B1 * | 8/2002 | Bakhsh et al. | .............. 280/729 |
| 6,460,929 | B2 * | 10/2002 | Kamida | ................... 297/344.1 |
| 6,676,154 | B2 * | 1/2004 | Fischer | ........................ 280/729 |
| 6,793,240 | B2 * | 9/2004 | Daines et al. | ............... 280/729 |
| 7,077,426 | B2 * | 7/2006 | Shaker et al. | ............ 280/730.2 |
| 7,159,922 | B2 * | 1/2007 | Iyoda et al. | ................... 296/66 |
| 2006/0006702 | A1 * | 1/2006 | Starna | ....................... 297/16.1 |

FOREIGN PATENT DOCUMENTS

JP  A-2002-200959  7/2002

* cited by examiner

*Primary Examiner*—Paul N. Dickson
*Assistant Examiner*—Joselynn Y. Sliteris
(74) *Attorney, Agent, or Firm*—Posz Law Group, PLC

(57) ABSTRACT

The head-protecting airbag apparatus is mounted on a vehicle whose third-row seat is so put away as to stand proximate to the inner side of a window. The airbag has three shielding portions, and includes a dividing recess between the third shielding portion and second shielding portion. In the event that the third shielding portion engages the folded seat during the course of airbag deployment, the dividing recess separates the lower edge of a region between the second shielding portion and the third shielding portion, so that the second shielding portion is not hindered from smooth development.

5 Claims, 15 Drawing Sheets

HEAD-PROTECTING AIRBAG APPARATUS

The present application claims priority from Japanese Patent Application No. 2005-205879 of Kino et al., filed on Jul. 14, 2005, the disclosure of which is hereby incorporated into the present application by reference.

BACKGROUND OF THE INVENTION

1. Field of the Invention

The present invention relates to a head-protecting airbag apparatus mounted on a vehicle having three rows of seats.

2. Description of Related Art

In the prior art, Japanese Patent Laid-Open No. 2002-200959 is illustrative of a head-protecting airbag apparatus mounted on a vehicle having three rows of seats. This apparatus includes an airbag which is folded and housed in the upper edge of windows inside the vehicle, and is deployable to cover the interior side of windows when fed with inflation gas from an inflator. In the conventional head-protecting airbag apparatus, the airbag includes three shielding portions inflatable with inflation gas so as to cover the interior side of three windows each of which is located at the side of the first to third row seats.

In the vehicle having three rows of seats, the third-row seat is often unoccupied. When the third-row seat is unoccupied, the seat may be folded or put away to provide more loading space. When the conventional airbag having three shielding portions deploys while the third-row seat is folded up, however, if the third-row seat is so put away as to stand proximate to the interior side of window, the third shielding portion adapted to cover the interior side of a window located at the side of the third-row seat is likely to engage the folded seat, and therefore be hindered from smooth development. Moreover, this may affect the first and second shielding portions deployable to cover the side of the first and second row seats which are occupied by vehicle occupants, and result in hindering the smooth deployment of the first and second shielding portions.

SUMMARY OF THE INVENTION

The present invention contemplates to solve the above-mentioned problems, and therefore, has an object to provide a head-protecting airbag apparatus whose shielding portions of an airbag for covering the interior side of first and second row windows develop and inflate smoothly in the event of absence of a passenger in the third-row seat, when the airbag includes three inflatable shielding portions for covering the interior side of windows.

The object of the present invention is achieved by a head-protecting airbag apparatus which is mountable on a vehicle having three rows of seats, a third-row seat of the vehicle being so put away as to stand proximate to an interior side of a window, the apparatus including an airbag secured at an upper edge thereof to a vehicle body along an upper edge of windows, while being folded and housed in the upper edge of the windows, the airbag, when fed with inflation gas by an inflator, protruding downward from a housing and deploying to cover the interior side of the windows, the airbag including a gas admissive portion admitting inflation gas inside thereof, and a non-admissive portion admitting no inflation gas, the gas admissive portion including a first, second, and third shielding portions each adapted to cover the interior side of each window at a complete inflation of the airbag, wherein:

the airbag includes a dividing recess extending upward from a lower edge of the airbag, in an area of the non-admissive portion between the third shielding portion adapted to cover the interior side of a window located at the side of the third-row seat and the second shielding portion adapted to cover the interior side of a window located at the side of a second-row seat; and the dividing recess, in the event that the third shielding portion engages the folded third-row seat during the course of airbag deployment, separates a lower edge of a region between the second shielding portion and the third shielding portion, so that the second shielding portion is not hindered from smooth development.

In the airbag apparatus of the present invention, the airbag is provided with the dividing recess extending upward from the lower edge, in an area of the non-admissive portion located between the second shielding portion and the third shielding portion. In the event that the third shielding portion engages the third-row seat during the course of airbag deployment when the third-row seat is not occupied by a passenger and therefore folded or put away as to stand proximate to the inner side of the third-row window, the recess separates the lower edge region between the second shielding portion and the third shielding portion, thereby the second shielding portion is not hindered from smooth development. Accordingly, the first and second shielding portions are capable of developing and inflating smoothly for covering the interior side of the windows located at the sides of the first and second-row seats.

Therefore, in the head-protecting airbag apparatus of the present invention, the shielding portions of the airbag for covering the interior side of the first- and second-row windows are capable of developing and inflating smoothly in the event of absence of a passenger in the third-row seat, although the airbag includes three inflatable shielding portions for covering the interior side of the windows.

When the airbag deploys on the condition that a passenger is seated in the third-row seat, the third shielding portion deploys and covers the interior side of the window located at the side of the third-row seat, as the first and second shielding portions do. Accordingly, the third shielding portion securely protects the head of the passenger seated in the third-row seat.

In the above-described airbag apparatus, the dividing recess may be provided at its leading end with a punched out portion recessed in a generally arcuate shape. The punched out portion will serve to relieve a stress concentration that would otherwise be created on the leading end of the dividing recess in the event that the third shielding portion engages the third-row seat folded and located proximate the interior side of the third-row window during airbag deployment.

In the above-described airbag apparatus, the dividing recess is preferably a slit formed merely by making a cut in an airbag material. With this arrangement, unlike the case where the dividing recess is formed by cutting a portion with certain width out of the non-admissive portion, a region of the non-admissive portion around the slit covers the interior side of the window and its surroundings such as a pillar sufficiently. That is, the airbag has a larger coverage area.

In the case where the dividing recess is a slit, it will also be appreciated that the dividing recess is a breakable portion that is breakable into a slit when the third shielding portion engages the folded third-row seat during the course of airbag deployment for separating the second shielding portion and third shielding portion.

With this arrangement, the breakable portion does not break unless the third shielding portion hits the third-row seat. Hence the airbag completes inflation with the region between the second shielding portion and the third shielding portion intact or unseparated. Therefore, the airbag has a large coverage area for covering the interior side of the window and its surroundings including a pillar. When the third shielding portion engages the folded third-row seat, the breakable portion breaks, and separates the lower edge region between the second shielding portion and the third shielding portion. Hence the third shielding portion does not affect the development of the second shielding portion, but allows the first and second shielding portions to deploy smoothly and cover the interior side of the windows located at the sides of the first and second-row seats.

In a case where the second shielding portion includes more than one vertical chambers disposed one behind another, each of which extends along the vertical direction, and each of the vertical chambers reduces its dimension in the longitudinal direction of vehicle when inflated, it will be appreciated that, when the airbag is completely inflated, the dividing recess is located rearward of a straight line connecting a rear end and lower end region of the second shielding portion and a mounting region of the airbag to the vehicle body located at an immediate rear of the second shielding portion, in such a manner as not to interrupt the straight line.

With this arrangement, the dividing recess does not sever the straight line connecting the rear end and lower end region of the second shielding portion and the mounting portion located at the immediate rear of the second shielding portion. Accordingly, when the airbag is completely inflated, a tension force is created between the rear end and lower end region of the second shielding portion and the above mounting portion, generally along the straight line.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
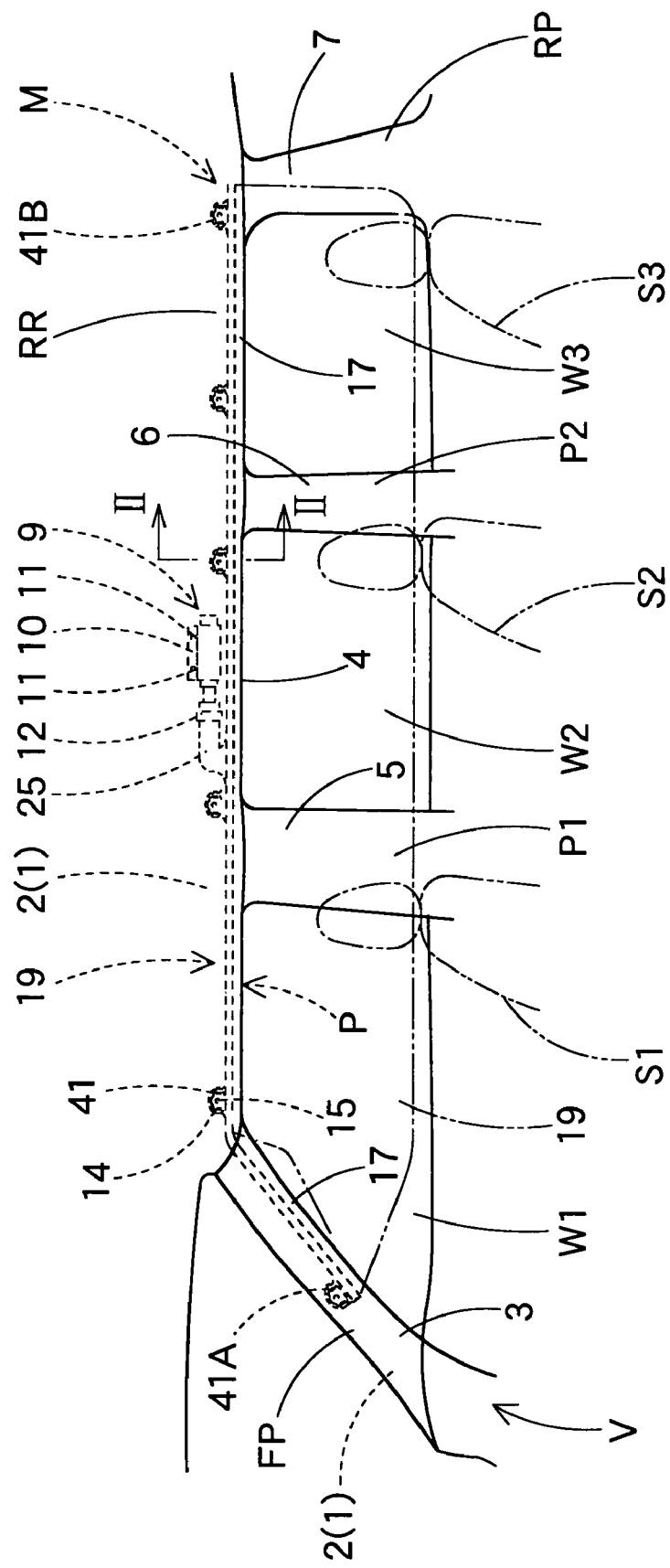
FIG. 1 is a schematic front view of a head-protecting airbag device embodying the present invention, as viewed from the interior of vehicle.
Figure 6:
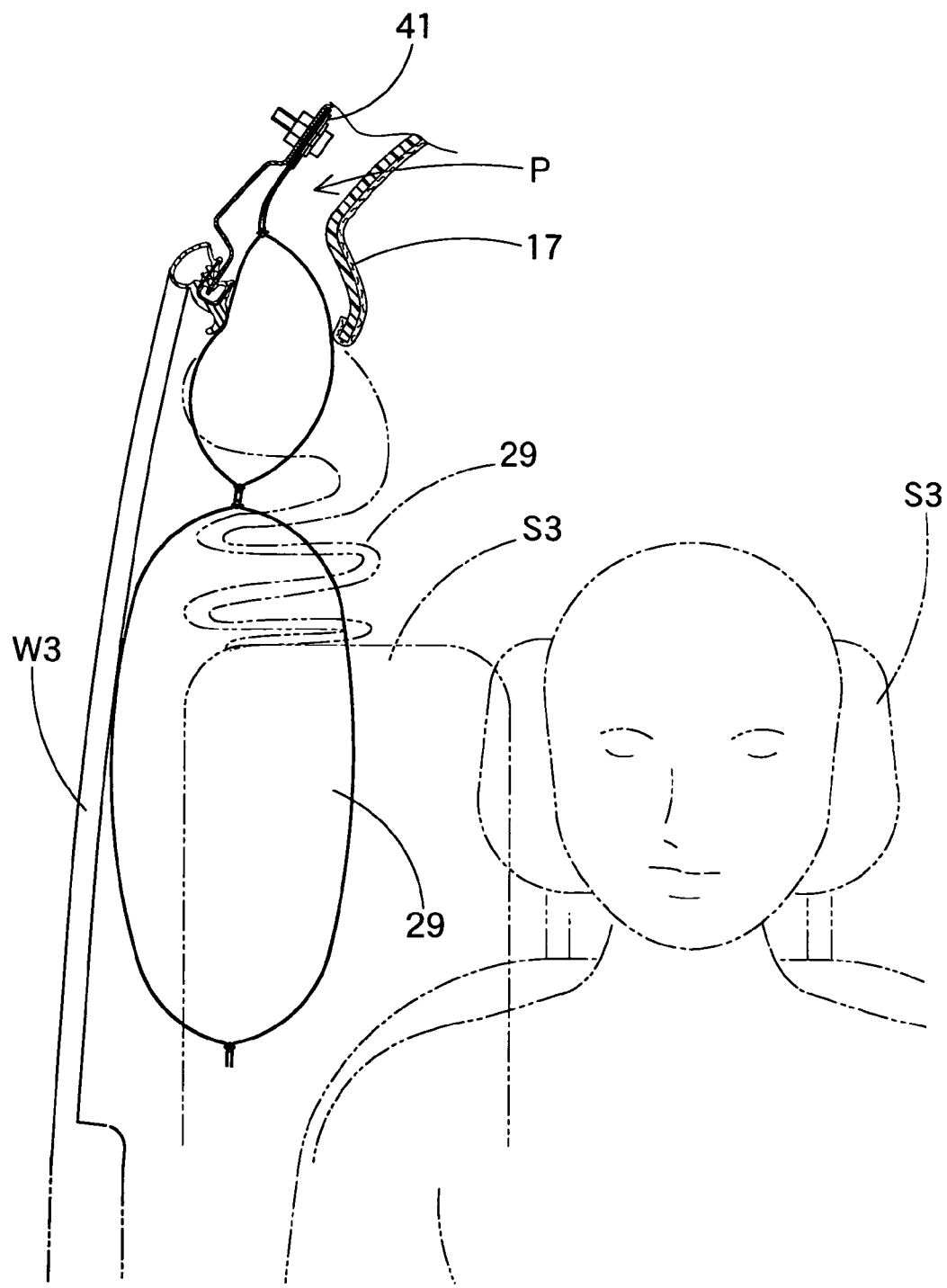
FIG. 6 is a schematic section taken along VI-VI of FIG. 5.

FIG. 1 illustrates a head-protecting airbag apparatus M embodying the present invention. The airbag apparatus M is mountable on a vehicle V with three rows of seats, S1, S2, S3 which seats are arranged one behind another in the vehicle's longitudinal direction. The airbag apparatus M is mounted on a front pillar FP and a roof side rail RR along the upper edge of windows or side windows W1, W2 and W3 through the region above a rear pillar RP. When not in service, the third-row seat S3 is so folded or put away as to stand proximate to the interior side of window W3, as indicated by double-dotted lines in FIG. 6.

The head-protecting airbag apparatus M includes an airbag 19, only one inflator 9, mounting brackets 10 and 14, and an airbag cover 17.

Figure 2:
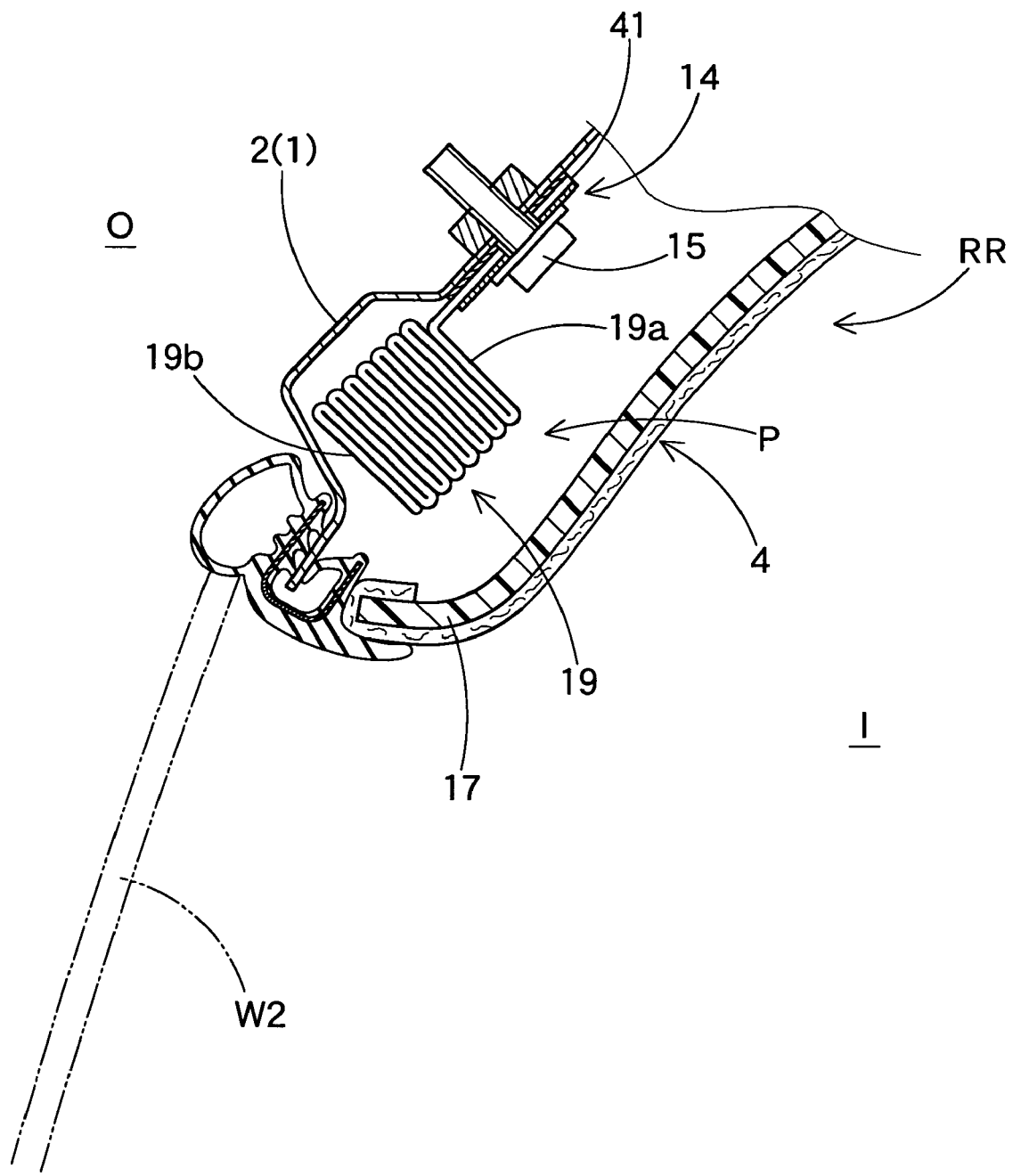
FIG. 2 is a sectional view taken along II-II of FIG. 1.

As shown in FIGS. 1 and 2, the airbag cover 17 is constructed of lower edge regions of a pillar garnish 3 arranged in the front pillar FP, and of the roof head lining 4 arranged in the roof side rail RR. The airbag cover 17 is adapted to cover the vehicle's inner side I of the airbag 19 in the folded and housed condition, and is so openable when pushed by the inflating airbag 19 as to allow the airbag to protrude into vehicle interior.

Referring to FIG. 1, the inflator 9 for supplying the airbag 19 with inflation gas has a substantially columnar shape. The inflator 9 includes gas discharge ports (unillustrated) for discharging the gas at its leading end or front end. The leading end region of the inflator 9 including the vicinity of the gas discharge ports is inserted into a later-described gas inlet port 25 of the airbag 19, and then a clamp 12 is mounted around the rear end 25a vicinity of the gas inlet port 25. Thus the inflator 9 is connected to the airbag 19. The inflator 9 is secured to an inner panel 2 as part of the vehicle body 1 at a position above a first middle pillar P1, by a mounting bracket 10 for holding the inflator 9 and mounting bolts 11 securing the bracket 10 to the inner panel 2.

Figure 3:
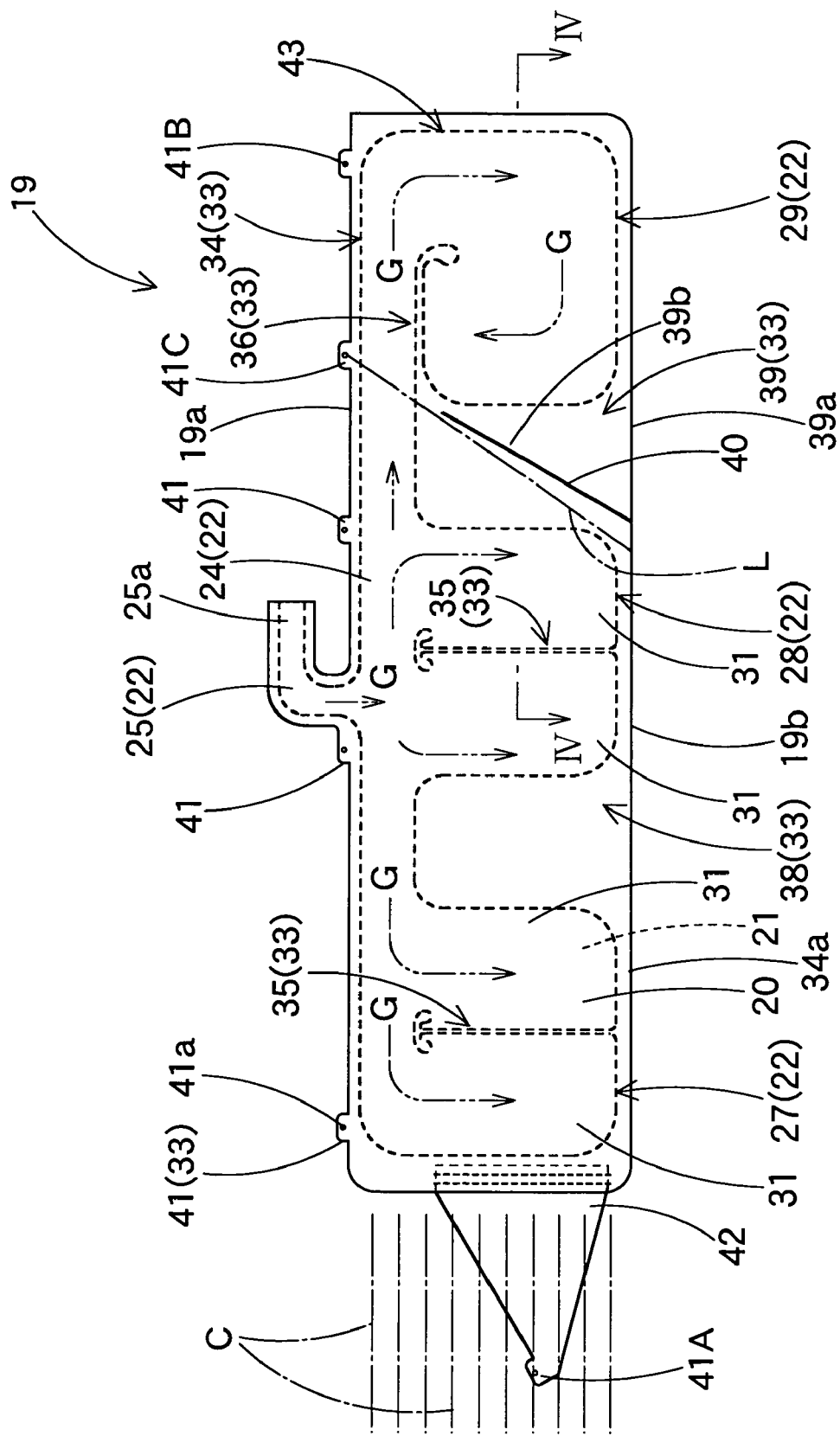
FIG. 3 shows an airbag employed in the airbag apparatus of FIG. 1 in a developed state, by a front view.

The airbag 19 is provided in its upper edge 19a with mounting portions 41 (FIGS. 1 and 3), and is secured to the inner panel 2 along the upper edge of the windows W1, W2 and W3, at the mounting portions 41. When fed with inflation gas by the inflator 9, the airbag 19 develops from the folded-up state and protrudes downward from a housing P (FIGS. 2 and 6), and deploys to cover the interior side of the windows W1, W2 and W3, and the first and second middle pillars P1 and P2. As shown in FIG. 3, the airbag 19 includes a gas admissive portion 22 which admits inflation gas G inside thereof, and a non-admissive portion 33 which admits no inflation gas.

In this specific embodiment, the admissive portion 22 includes a gas feed path 24, a gas inlet port 25, a first shielding portion 27, a second shielding portion 28 and a third shielding portion 29.

As shown in FIG. 3, the gas feed path 24 is arranged in the vehicle's longitudinal direction along the upper edge 19a of the airbag 19, and serves to guide the inflation gas G discharged from the inflator 9 into the first, second and third shielding portions 27, 28 and 29 located below the gas feed path 24. In a position slightly offset forward from the longitudinal center of the gas feed path 24 is a gas inlet port 25 to be connected with the inflator 9. The inlet port 25 projects upward from the gas feed path 24, and communicates with the gas feed path 24. In the illustrated embodiment, the gas inlet port 25 opens toward its rear end 25a. The inlet port 25 is connected to the inflator 9 with the clamp 12.

Referring to FIG. 3, the first shielding portion 27 is adapted to cover the inner side of the window W1 located at the side of the first-row seat S1 at a complete inflation of the airbag 19. The second shielding portion 28 is adapted to cover the inner side of the window W2 located at the side of the second-row seat S2 at the complete inflation of the airbag 19. The third shielding portion 29 is adapted to cover the inner side of the window W3 located at the side of the third-row seat S3 at the complete inflation of the airbag 19. Each of the first and second shielding portions 27 and 28 includes in its area a plurality of vertical chambers 31 extending along the vertical direction. The vertical chambers 31 are disposed one behind another by being partitioned by a later-described thickness regulating portion 35. In the foregoing embodiment, each of the first and second shielding portions 27 and 28 has two vertical chambers 31. Each of the vertical chambers 31 communicates with the gas feed path 24 at its upper end, whereas it is closed at its lower end. Thus the vertical chambers 31 admit inflation gas G from the upper end communicated with the gas feed path 24. The third shielding portion 29 is partitioned by a later-described partitioning member 36 in the front and upper end region thereof, whereas it is communicated with the gas feed path 24 in its upper end and rear end vicinity region. The third shielding portion 29 admits inflation gas G from the upper end and rear end vicinity region.

The non-admissive portion 33 includes a peripheral portion 34 defining the margin of the gas admissive portion 22, a plurality of thickness regulating portions 35 for regulating thicknesses of the first and second shielding portions 27 and 28 at the complete inflation, so that the shielding portion 27 and 28 inflate in a plate shape, a panel portion 38 located between the first and second shielding portions 27 and 28, a panel portion 39 located between the second and third shielding portions 28 and 29, a partitioning portion 36 projecting rearward from the panel portion 39 located forward of the third shielding portion 29, and mounting portions 41 provided along the upper edge 19a of the airbag 19.

As shown in FIG. 3, the panel portion 38 extends continuously in a longitudinal direction between the first shielding portion 27 and the second shielding portion 28. Further, as shown in FIG. 3, a lower edge of the first panel portion extends directly and continuously between a lower edge of the first shielding portion and a lower edge of the second shielding portion, when the airbag is deployed.

Each of the thickness regulating portions 35 extends linearly in the vertical direction inside the first/second shielding portion 27/28, and is connected at its lower end with a region 34a of the peripheral portion 34 defining the lower edge of the first and second shielding portions 27 and 28. The partitioning portion 36 projects rearward from a rear end and upper end region of the panel portion 39 in such a manner as to partition the third shielding portion 29 and the gas feed path 24. The partitioning portion 36 extends linearly in the longitudinal direction of vehicle, and its leading end is located generally in the longitudinal center of the third shielding portion 29.

The non-admissive portion 33 further includes a joint cloth 42 is located in the front end of the airbag 19. The joint cloth 42 is coupled to the vicinity of the front edge of the first shielding portion 27 of the airbag 19 by sewing work. When the airbag 19 is completely inflated, the joint cloth 42 is located in the vicinity of the lower part of the front pillar FP. The joint cloth 42 also has a mounting portion 41.

Figure 4:
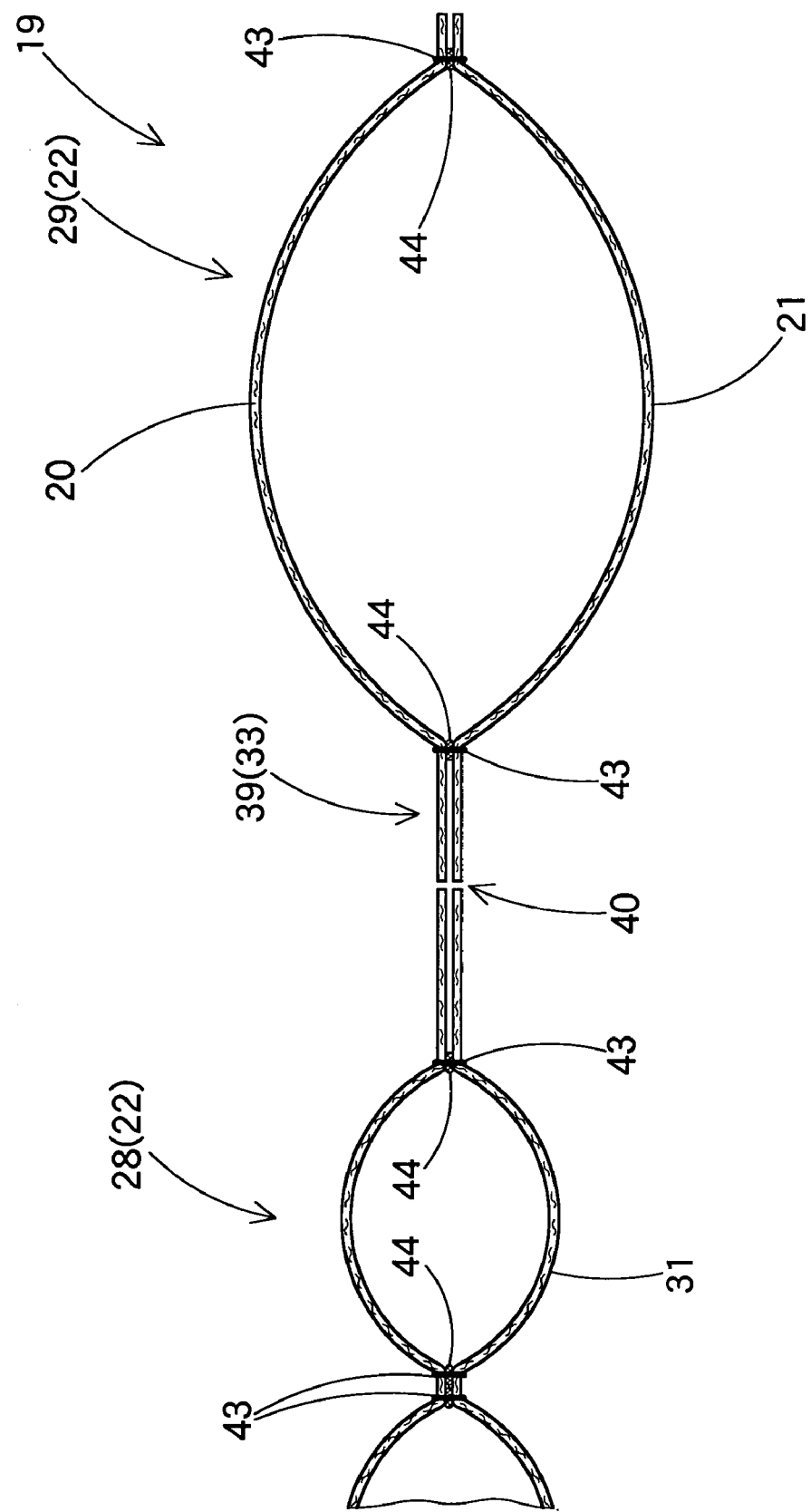
FIG. 4 is a sectional view taken along IV-IV of FIG. 3.

In this specific embodiment, the airbag 19 is manufactured by joining flexible cloth members of plain-woven fabric, for example, woven by polyester yarn, polyamide yarn or the like. More specifically, as shown in FIG. 4, the airbag is made by joining a vehicle's inner wall 20 and a vehicle's outer wall 21, which are cloth members as described above, at predetermined regions both by sewing work with sewing yarn 43 and by adhesion with an adhesive 44, into a bag shape. Out of the non-admissive portion 33, the peripheral portion 34, the thickness regulating portions 35, and the partitioning portion 36 are also formed by joining the walls 20 and 21 by sewing work and adhesion. In the foregoing embodiment, moreover, the thickness regulating portions 35 and the partitioning portion 36 are formed simultaneously with the peripheral portion 34, i.e., by a single stroke of sewing work and adhesion. That is, the stitch line and adhesion area forming the peripheral portion 34, the thickness regulating portions 35, and the partitioning portion 36 are all continuous. Furthermore, the adhesive 44 desirably has elasticity in order to prevent gas leakage from seams of the sewing yarn 43, and in order to relieve a tension force applied to the walls 20 and 21 at the complete inflation of the airbag 19. The foregoing embodiment uses silicone rubber for the adhesive 44. No adhesive is used to connect the joint cloth 42 with the remaining region of the airbag 19.

The mounting portions 41 are located at a plurality of (six, in the illustrated embodiment) positions in the upper edge 19a of the airbag 19. Except in the joint cloth 42, each of the mounting portions 41 has a two-ply structure of the walls 20 and 21, and is provided with a mounting hole 41a to put a mounting bolt 15 therethrough.

The panel portions 38 and 39 are located between the first and second shielding portions 27 and 28 and between the second and third shielding portions 28 and 29, respectively, below the gas feed path 24. The panel portions 38 and 39 are adapted to secure an entire contour of the airbag 19, and also to shorten the time to complete airbag inflation by reducing the volume of the gas admissive portion 22.

The panel portion 39 arranged between the second and third shielding portions 28 and 29 is provided with a dividing recess or a slit 40. The slit 40 extends upward from the lower edge 39a of the panel portion 39, and serves to separate the lower edge 39a forward and rearward. In the foregoing embodiment, the dividing recess 40 is formed merely by making a cut by any cutter in the walls 20 and 21, without cutting a portion out of the walls 20 and 21. The slit 40 extends straightly in such a slanting manner that its lower end is located forward whereas its upper end located rearward. The upper end of the slit 40 is positioned in the vicinity of the partitioning portion 36. The vertical length of the slit 40 is set to such a dimension that, when the third shielding portion 29 engages the folded seat S3 during the course of airbag deployment, the third shielding portion 29 does not hinder the inflation of the second shielding portion 28, but allows the same to complete inflation smoothly.

Manufacturing of the airbag 19 is now described. Firstly, the adhesive 44 is applied to the locations of the peripheral portion 34, the thickness regulating portions 35 and the partitioning portion 36, in an inner side of, for example the vehicle's outer wall 21, out of the walls 20 and 21 for forming the airbag 19. Then the vehicle's inner wall 20 is overlaid on the vehicle's outerwall 21, and the are a coated by the adhesive 44 is pressed so the adhesive force uniformly acts over the entire area of the peripheral portion 34, the thickness regulating portions 35 and the partitioning portion 36. Subsequently, the walls 20 and 21 are sewn up with the sewing yarn 43 at the adhered area, and then the joint cloth 42 is sewn to the remaining region of the airbag 19. Thereafter, the panel portion 39 is slit up by a cutter to provide the slit 40. Thus the airbag 19 is completed. It will also be appreciated that each of the walls 20 and 21 is preliminarily provided with a slit 40.

To mount the airbag apparatus M on the vehicle V, the airbag 19 is firstly folded up. More specifically, the airbag 19 is folded up in a bellows fashion as illustrated in FIG. 2, on numerous creases C (FIG. 3) extending along the longitudinal direction of vehicle so that the lower edge 19b of the airbag 19 is brought close to the upper edge 19a. The folded-up airbag 19 is wrapped at predetermined positions with a breakable wrapping member (not shown) for keeping the folded-up configuration. Subsequently, the mounting brackets 14 are attached to the mounting portions 41, and the inflator 9 is connected to the gas inlet port 25 with the clamp 12. Then the bracket 10 is mounted around the inflator 9 to form an airbag module.

Thereafter, the individual mounting brackets 10 and 14 are located at predetermined positions of the inner panel 2, and fixed thereto with bolts 11 and 15. Then, an unillustrated lead wire extending from a suitable control for actuating the inflator is connected to the inflator 9. If then the pillar garnish 3, the roof head lining 4, and further the pillar garnishes 5, 6 and 7 are attached to the vehicle body 1, the airbag apparatus M is mounted on the vehicle V.

Figure 5:
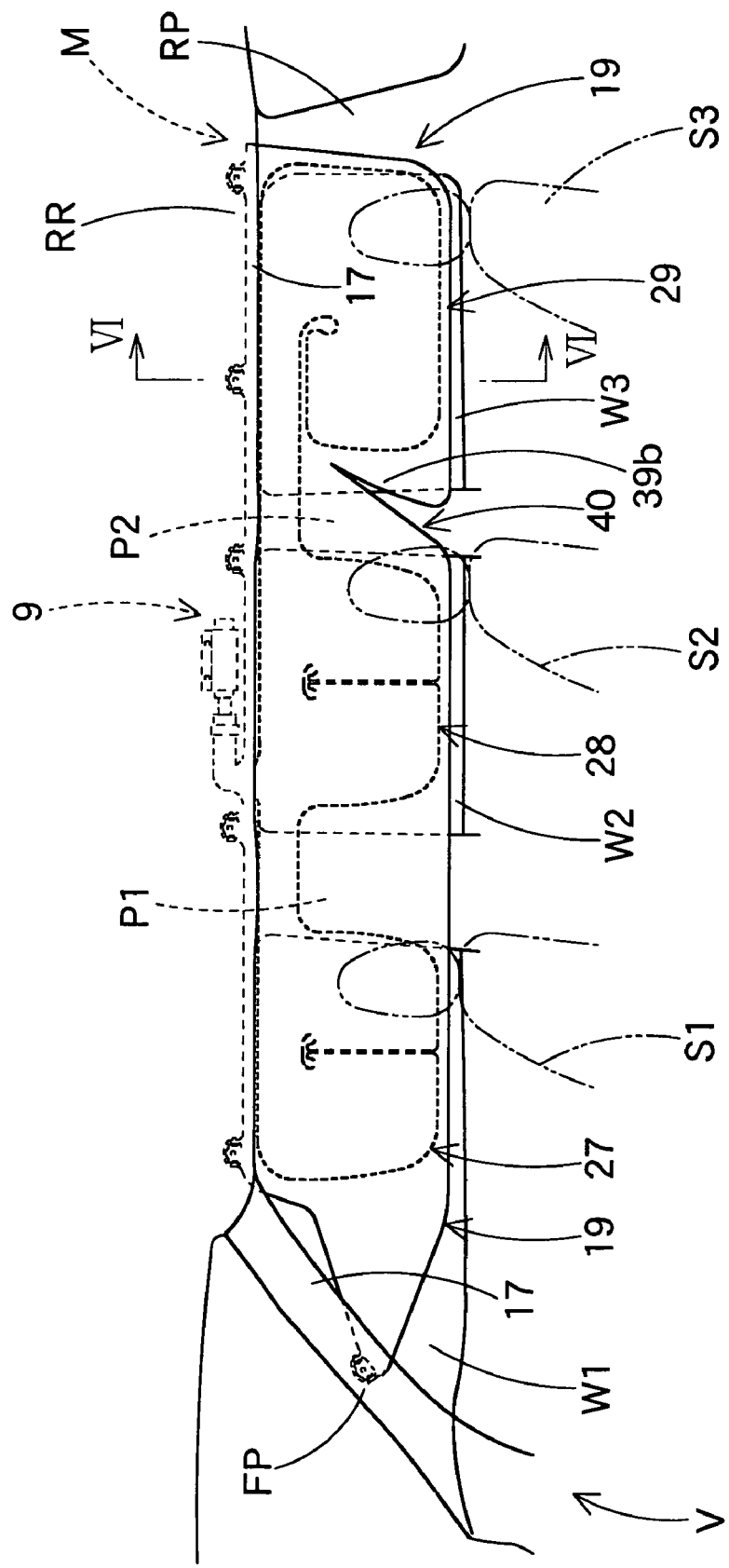
FIG. 5 is a schematic front view of the airbag of FIG. 3 in a completely inflated state, as viewed from the interior of vehicle.

When the inflator 9 is actuated after the airbag apparatus M is mounted on the vehicle V, the inflation gas G discharged from the inflator 9 flows into the airbag 19 (FIG. 3), and the airbag 19 then breaks the wrapping member, pushes and opens the airbag cover 17 constructed of the lower edges of the pillar garnish 3 and roof head lining 4, and inflates to cover the inner side of windows W1, W2 and W3, the first and second middle pillars P1 and P2, and the rear pillar RP, while protruding downward as shown in FIG. 1 (double-dotted lines) and FIG. 5.

Figure 7:
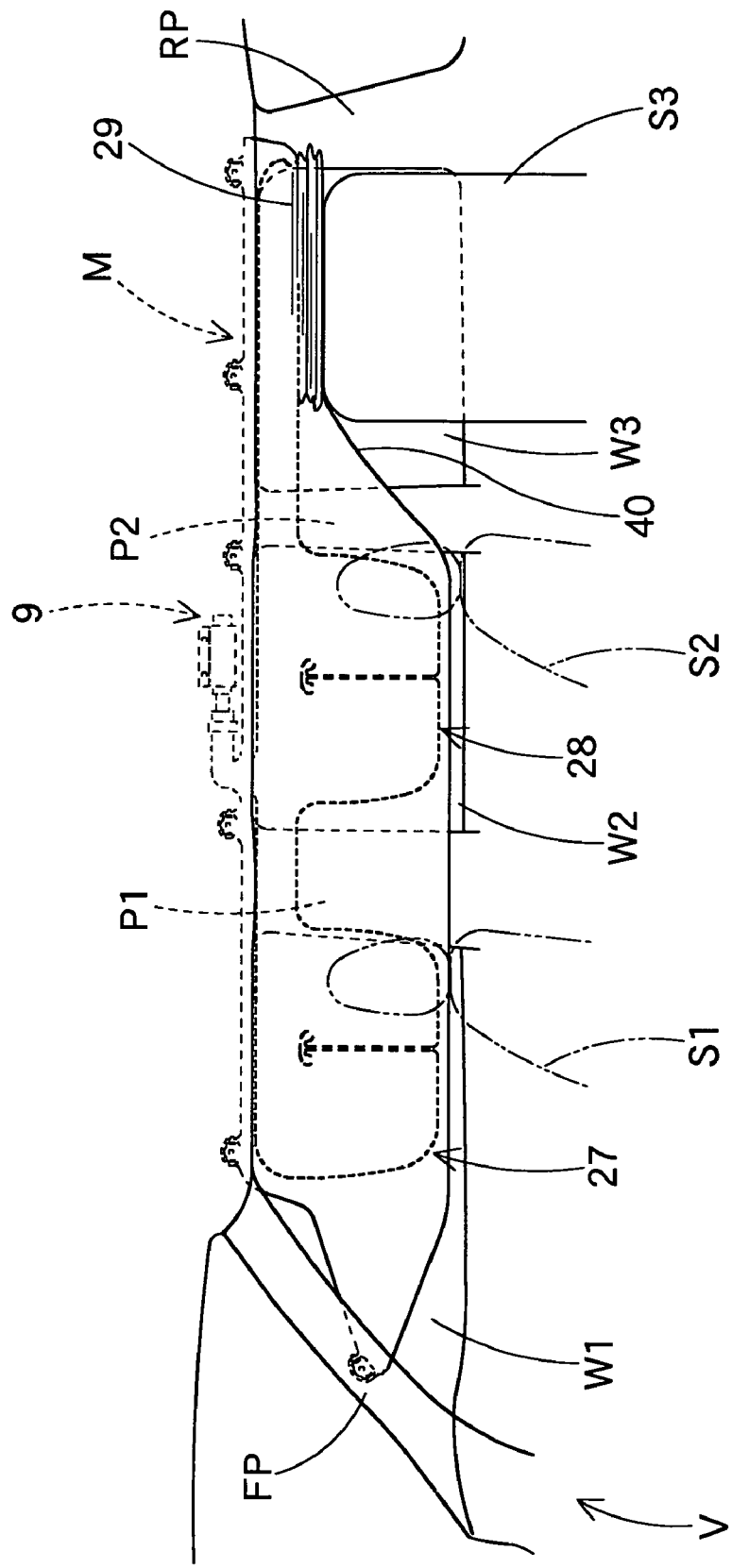
FIG. 7 is a schematic front view of the airbag of FIG. 3 having completed inflation in a state where a third-row seat is put away, as viewed from the interior of vehicle.

In the airbag apparatus M of the foregoing embodiment, the airbag 19 is provided with the slit 40 serving as the dividing recess which slit or recess extending upward from the lower edge 39a of the panel portion 39, in the area of the panel portion 39 or the non-admissive portion 33 located between the second shielding portion 28 and the third shielding portion 29. In the airbag apparatus M, in the event that the third shielding portion 29 engages the third-row seat S3 during the course of airbag deployment (FIG. 7) when the third-row seat S3 is not occupied by a passenger and therefore folded as to stand proximate to the inner side of the third-row window W3, the slit 40 separates the lower edge region between the second shielding portion 28 and the third shielding portion 29, thereby the second shielding portion 28 is not hindered from smooth development. Accordingly, the first and second shielding portions 27 and 28 are capable of developing and inflating smoothly to cover the inner side of the windows W1 and W2 located at the sides of the first and second-row seats S1 and S2.

Therefore, in the head-protecting airbag apparatus M embodying the present invention, the shielding portions 27 and 28 of the airbag 19 for covering the inner side of the first-and second-row windows W1 and W2 are capable of developing and inflating smoothly in the event of absence of a passenger in the third-row seat, although the airbag 19 includes three inflatable shielding portions 27, 28 and 29 for covering the interior side of the windows W1, W2 and W3.

When the airbag 19 deploys on the condition that a passenger is seated in the third-row seat S3, the third shielding portion 29 deploys and covers the inner side of the window W3 located at the side of the third-row seat S3, as shown in FIG. 5, as the first and second shielding portions 27 and 28 do. Accordingly, the third shielding portion 29 securely protects the head of the passenger seated in the third-row seat S3 when completely inflated.

In the airbag apparatus M, moreover, the dividing recess is the slit 40 formed by making a cut in or slitting up the airbag material instead of cutting a portion out of the material. Unlike the case where the dividing recess is an indentation or the like with a certain width formed by cutting a portion out of the panel portion 39, a region 39b of the panel portion 39 around the slit 40 covers the inner side of the window W3 and the second middle pillar P2 next to the window W3 and so on sufficiently. That is, the airbag 19 has a larger coverage area.

Figure 8:
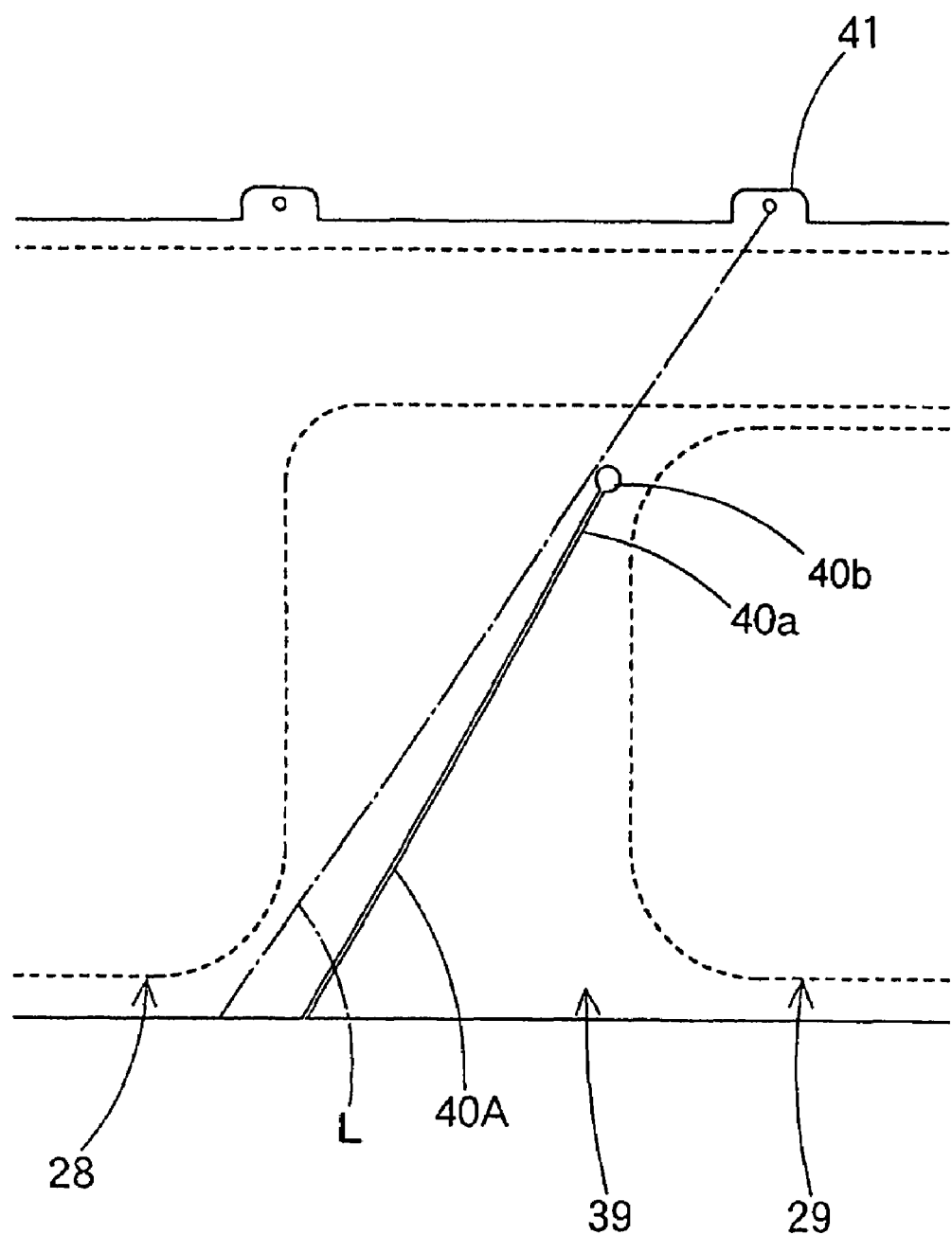
FIG. 8 is a partial enlarged front view of a modification of the airbag of FIG. 3.

Alternatively, the dividing recess may have a punched out portion or a notch at the leading end, as a slit 40A shown in FIG. 8. The notch 40b formed at the leading end 40a of the slit 40A is recessed in a generally arcuate shape. With this arrangement, in the event that the third shielding portion engages the third-row seat during the course of airbag deployment when the third-row seat is put away as to stand proximate to the inner side of the third-row window, the notch 40b serves to relieve as tress concentration that would otherwise be created on the leading end 40a of the slit 40A, so that the panel portion 39 is prevented from being torn from the leading end 40a.

Figure 9:
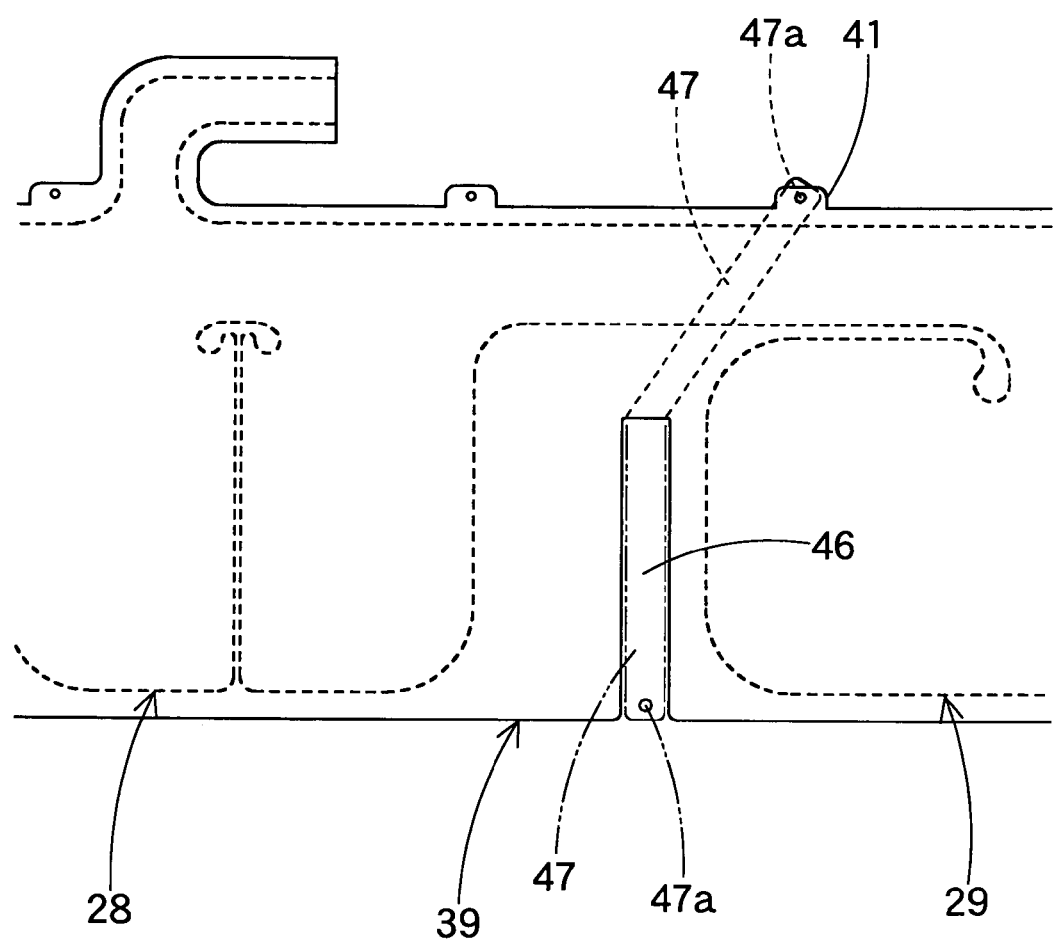
FIG. 9 is a partial enlarged front view of another embodiment of the airbag of the present invention.
Figure 10:
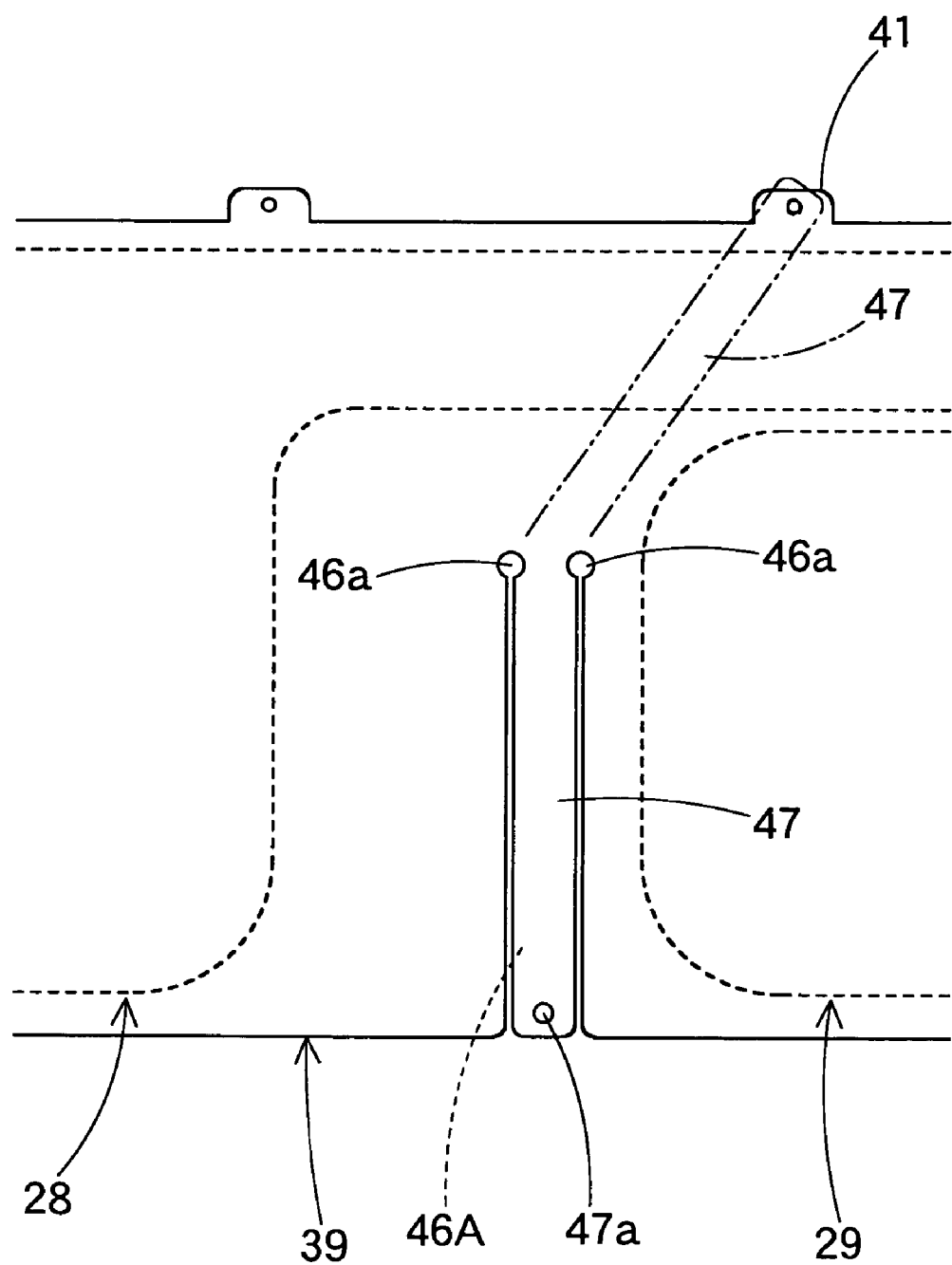
FIG. 10 is a partial enlarged front view of a modification of the airbag of FIG. 9.

If not considering retaining a wide coverage area by a slit serving as a dividing recess, the dividing recess may alternatively be formed as shown in FIG. 9. The dividing recess 46 shown extending upward from the lower edge of the panel portion 39 in FIG. 9 is made by cutting in the panel portion 39 in such a manner as to provide a band-shaped flap 47, and folding back the flap 47 from the root region. As can be seen from FIG. 9, the flap 47 is provided at its leading end with a slot or a hole 47a to insert a mounting bolt 15 therethrough. In the illustrated embodiment, the flap 47 is folded back toward the exterior side of the airbag 19, and is secured at the leading end to the vehicle body 1 together with a mounting portion 41 of the airbag located above the third shielding portion 29. In this case, too, leading ends of the cuts for providing the recess 46 and the flap 47, or the root regions of the flap 47 may be provided each with a punched out portion or a notch 46a, which notch being recessed in a generally arcuate shape, as a dividing recess 46A shown in FIG. 10.

Figure 11:
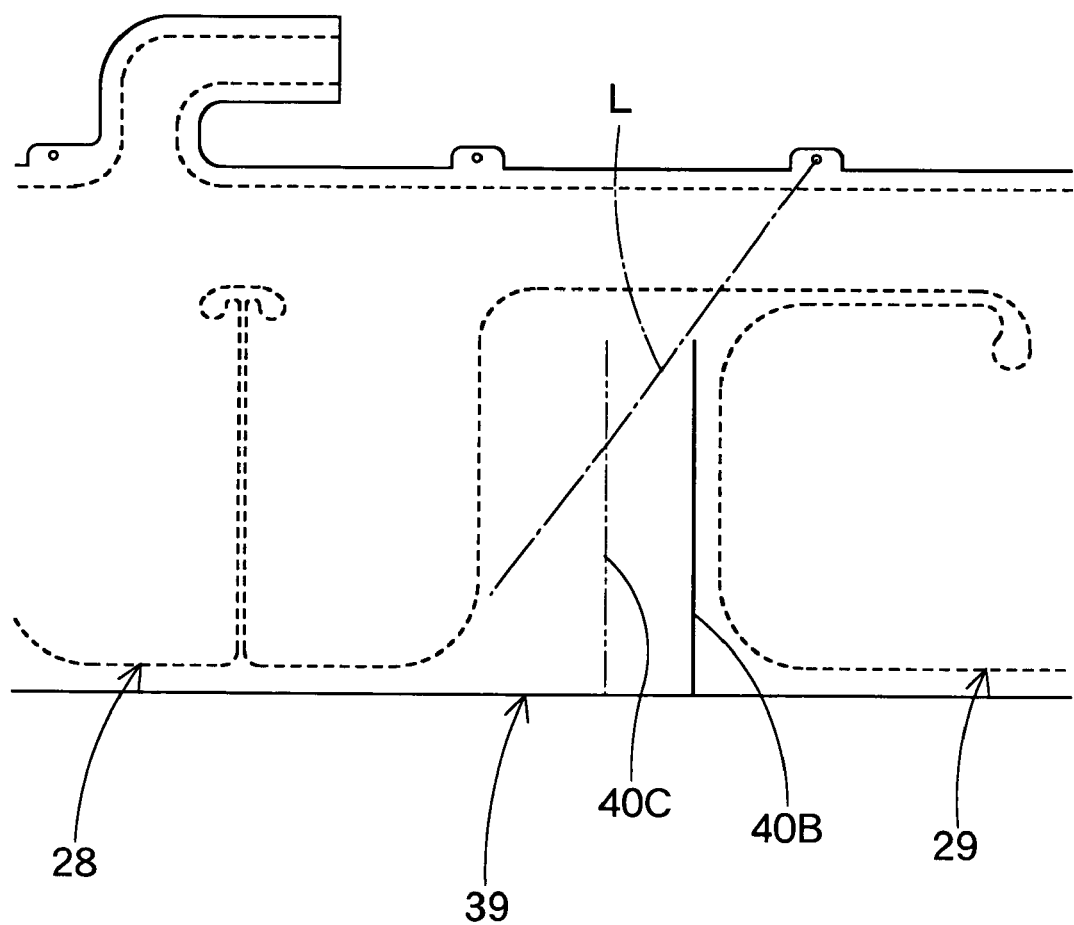
FIG. 11 is a partial enlarged front view of yet another embodiment of the airbag of the present invention.

In the airbag apparatus M, each of the first and second shielding portions 27 and 28 of the airbag 19 has more than one vertical chamber 31 extending along the vertical direction, and the vertical chambers 31 are disposed one behind another. Each of the chambers 31 reduces its longitudinal dimension when completely inflated. At this time, a great tension force is generated along the longitudinal direction of the airbag 19 between a foremost mounting portion 41A and a rearmost mounting portion 41B (FIG. 3). In the airbag apparatus M, the slit 40 separates the lower edge region of the airbag between the second shielding portion 28 and the third shielding portion 29. Accordingly, in addition to the tension force described above (a first tension force), a second tension force is created in the vicinity of the rear edge of the second shielding portion 28, along a straight line L (a single-dotted line in FIG. 3) connecting a rear end and lower end region of the second shielding portion 28 and a mounting portion 41C located at an immediate rear of the second shielding portion 28. As shown in FIG. 3, the mounting portion 41C, which is located rearward of the second shielding portion 28, is rearward of the an upper end of the slit 40. Furthermore, in the foregoing embodiment, the slit 40 is so arranged rearward of the straight line L as not to interrupt the line L. Therefore, the second tension is smoothly generated generally along the straight line L. The slit 40 shown in the foregoing embodiment is slanted generally along the line L, locating the lower end forward and the upper end rearward. However, the arrangement of the slit 40 should not be limited thereby, but it may be disposed as shown in FIG. 11 at 40B, for example generally vertically at a position proximate to the front edge of the third shielding portion 29, but not interrupting the line L. The slit may be so disposed as to intersect the line L, as shown by a double-dotted lime in FIG. 11 at 40C, if not considering the tension farce to be generated between the rear end and lower end region of the second shielding portion 28 and the mounting portion 41C at the rear of the second shielding portion 28 at a complete inflation of the airbag.

Figure 12:
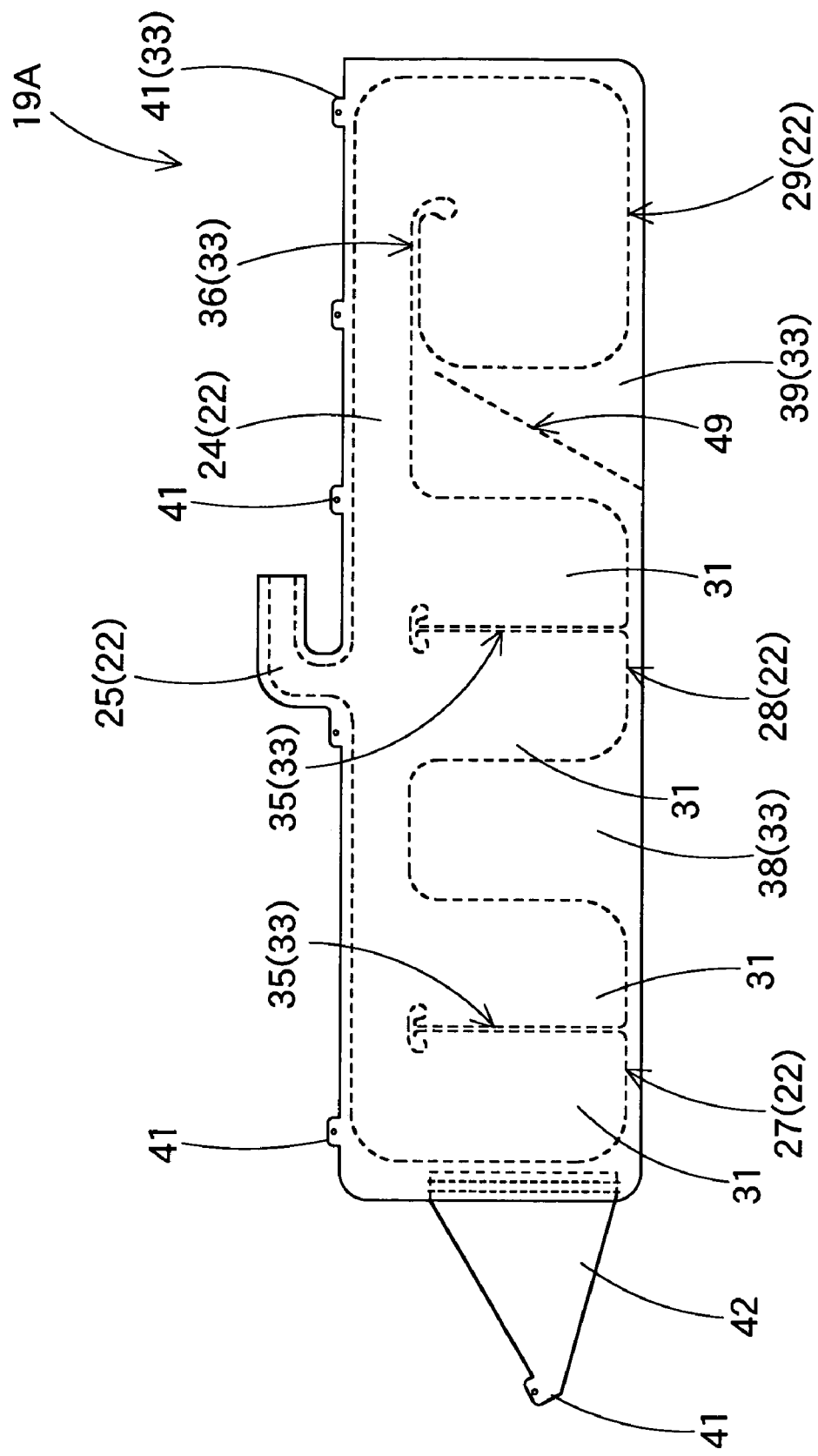
FIG. 12 is a front view of yet another embodiment of the airbag of the present invention.

FIG. 12 illustrates a further alternative embodiment of the airbag, at 19A. In the airbag 19A, the dividing recess is shown as a breakable portion 49 constructed of a perforated line or intermittent cuts. The airbag 19A has an identical construction to the above-described airbag 19 except the breakable portion 49, and therefore, descriptions of common members will be omitted by designating them with common reference numerals.

The breakable portion 49 is constructed of a straight perforated line or numerous intermittent cuts. Alike the slit 40 in the above-described airbag 19, the breakable portion 49 is disposed in a slanting manner having its lower end forward and its upper end rearward. In the foregoing embodiment, the breaking strength of the breakable portion 49 is so set that it breaks only when the third shielding portion 29 engages the folded third-row seat S3 during airbag deployment.

Figure 13:
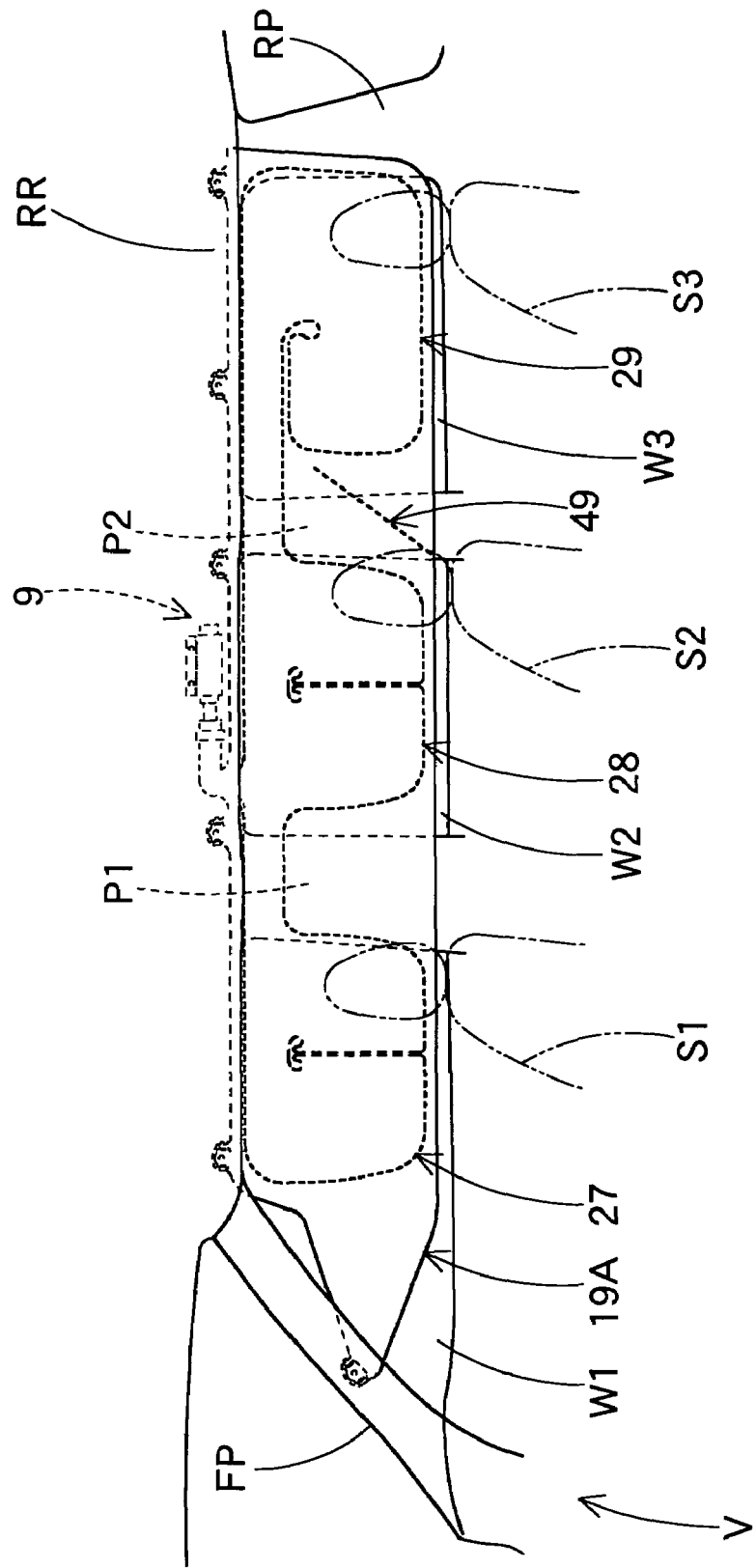
FIG. 13 is a schematic front view of a head-protecting airbag apparatus employing the airbag of FIG. 12 as viewed from the interior of vehicle, where the airbag is completely inflated.
Figure 14:
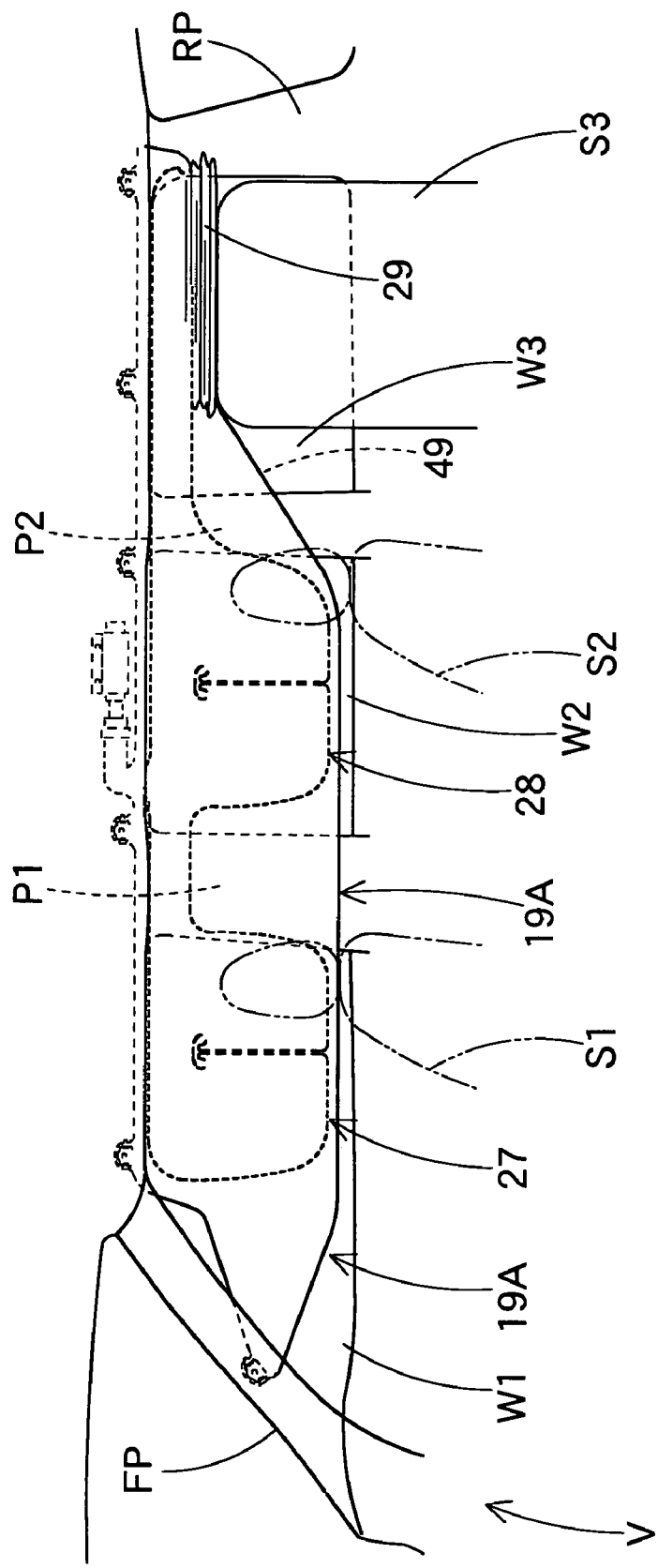
FIG. 14 is a schematic front view of the head-protecting airbag apparatus of FIG. 13 as viewed from the interior of vehicle, where the airbag is completely inflated in a state the third-row seat is folded.
Figure 15:
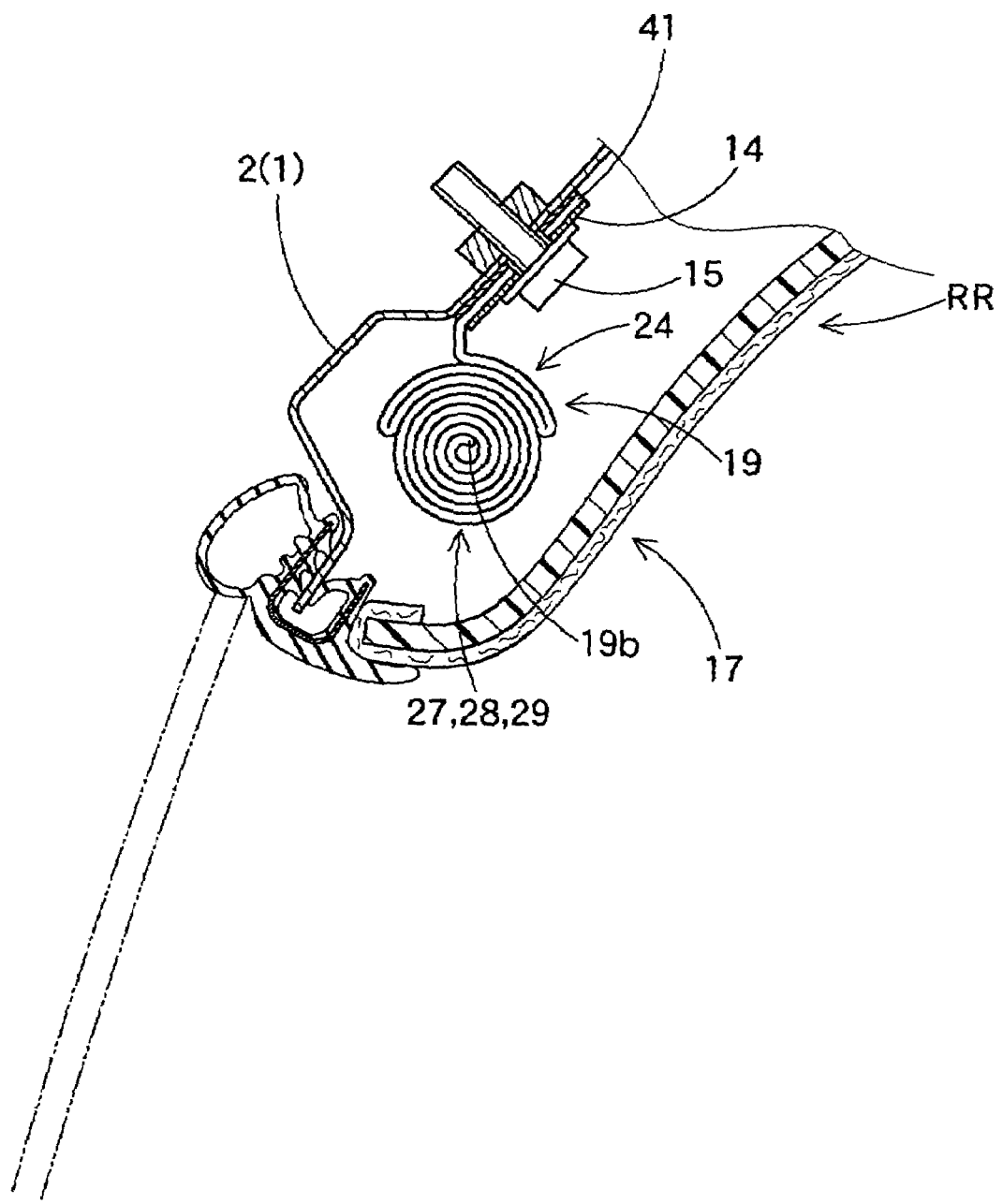
FIG. 15 is a schematic section illustrating a modification of the folding manner of the airbag for housing the airbag.

When the airbag 19A deploys on the condition that the third-row seat S3 is occupied by a passenger, the third shielding portion 29 does not hit the seat S3 during airbag deployment. Accordingly, the airbag 19A completes inflation with no breakage of the breakable portion 49, as shown in FIG. 13. In other words, the airbag 19A completes inflation with an intact, or unseparated region between the second shielding portion 28 and the third shielding portion 29. Therefore, in this circumstance, the airbag 19A has a large coverage area for covering the interior side of the window W3 and its surroundings such as the second middle pillar P2. When the third shielding portion 29 engages the folded third-row seat S3, the portion 49 breaks into a slit, and separates the lower edge region between the second shielding portion 28 and the third shielding portion 29. The third shielding portion 29 does not affect the development of the second shielding portion 28, but allows the first and second shielding portions 27 and 28 to deploy smoothly and cover the interior side of the windows W1 and W2 located at the sides of the first and second-row seats S1 and S2, as shown in FIG. 14.

Although the airbag 19 and airbag 19A of the foregoing embodiments are manufactured by joining predetermined regions of two predetermined-shaped cloth members with sewing yarn and adhesive, the present invention should also be applicable to an airbag manufactured by hollow-weaving method, for example.

In the foregoing embodiments, what is called a cold cutter is used to cut the cloth members or the vehicle's inner wall 20 and outer wall 21 in order to provide the dividing recesses in the airbags 19 and 19A. However, means to form the recesses should not be limited thereby, but it will also be appreciated to employ a hot cutting means like a laser cutter to provide a dividing recess. A laser cutter melts and resolidifies the periphery of the recess, which will prevent the cloth members from fraying therefrom.

With respect to the folding manner of the airbag, furthermore, the airbags 19 and 19A of the embodiments are bellows-folded in such a manner as to bring the lower edge 19b of the airbag close to the upper edge 19a. However, it will also be appreciated, for example, to fold a region of the gas feed path 24 in a bellows-fashion, whereas roll-fold regions of the first, second and third shielding portions 27, 28 and 29 located below the path 24 toward the vehicle's outer wall from the lower edge 19b.

What is claimed is:

1. A head-protecting airbag apparatus mountable on a vehicle having three rows of seats and windows, a third-row seat of the vehicle being so folded as to stand proximate to an interior side of the windows, the apparatus comprising an airbag secured at an upper edge thereof to a vehicle body along an upper edge of windows, while being folded and housed in the upper edge of the windows, the airbag, when fed with inflation gas by an inflator, protruding downwardly from a housing and deploying to cover the interior side of the windows, the airbag comprising a gas admissive portion admitting inflation gas inside thereof, and a non-admissive portion admitting no inflation gas, the gas admissive portion comprising a first, second, and third shielding portions each adapted to cover the interior side of each window at a complete inflation of the airbag;

mounting portions located at an upper edge of the airbag for securing the airbag to a body of the vehicle along an upper edge of the windows, wherein the airbag is secured at the mounting portions to the vehicle body along the upper edge of the windows; and a dividing recess extending upwardly from a lower edge of the airbag, in an area of the non-admissive portion between the third shielding portion adapted to cover the interior side of a window located at the side of the third-row seat and the second shielding portion adapted to cover the interior side of a window located at the side of a second-row seat, wherein:

the dividing recess, in the event that the third shielding portion engages the folded third-row seat during the course of airbag deployment, separates a lower edge of a region between the second shielding portion and the third shielding portion, so that the second shielding portion is not hindered from smooth development;

the non-admissive portion includes a first panel portion located between the first shielding portion and the second shielding portion and a second panel portion located between the second shielding portion and the third shielding portion;

the dividing recess is arranged at the second panel portion;

the mounting portions are arranged in an upper area of the third shielding portion;

the second shielding portion comprises more than one vertical chambers disposed one behind another, each of the vertical chambers extending along the vertical direction;

each of the vertical chambers reduces a dimension thereof in the longitudinal direction of vehicle when inflated;

when the airbag is completely inflated, the dividing recess is located rearward of a straight line connecting a rear end and lower end region of the second shielding portion and one of the mounting portions located at an immediate rear of the second shielding portion, in such a manner as not to interrupt the straight line; and the one of the mounting portions is rearward of an upper end of the dividing recess.

2. The head-protecting airbag apparatus as set forth in claim 1, wherein the dividing recess comprises a punched out portion at a leading end thereof, the punched out portion being recessed in a generally arcuate shape.

3. The head-protecting airbag apparatus as set forth in claim 1, wherein the dividing recess is a slit.

4. The head-protecting airbag apparatus as set forth in claim 3, wherein:

the dividing recess is a breakable portion, the breakable portion breaking into a slit when the third shielding portion engages the folded third-row seat during the course of airbag deployment, thereby separating the second shielding portion and third shielding portion.

5. The head-protecting airbag apparatus as set forth in claim 1, wherein the first shielding portion is joined to the second shielding portion by the first panel portion, which extends continuously in a longitudinal direction between the first shielding portion and the second shielding portion, and a lower edge of the first panel portion extends directly and continuously between a lower edge of the first shielding portion and a lower edge of the second shielding portion, when the airbag is deployed.

* * * * *